July 7, 1959  R. TRUBERT  2,893,637
THERMOSTATIC MIXER WITH DETACHABLE MECHANISM
Filed Sept. 14, 1956  3 Sheets-Sheet 1
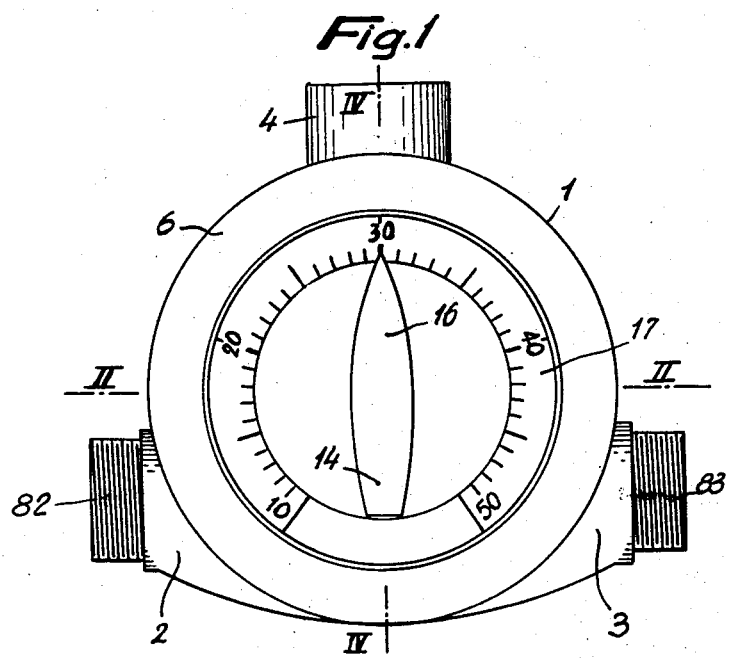
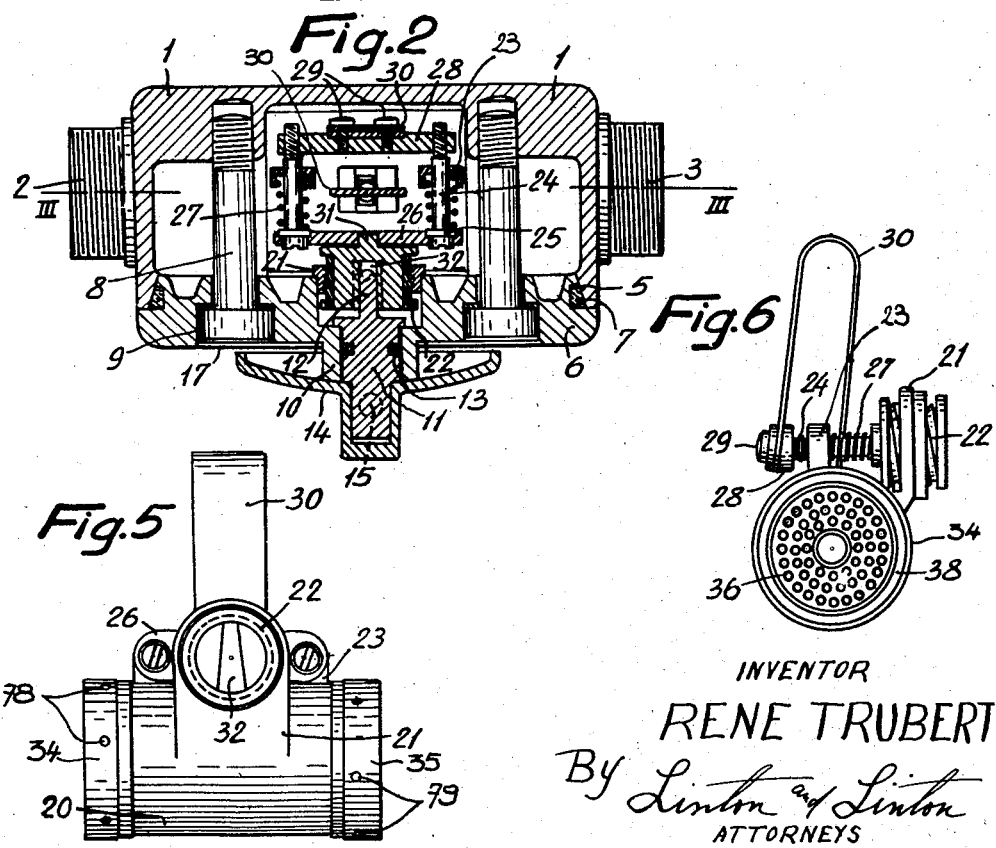
INVENTOR
RENE TRUBERT
By Linton and Linton
ATTORNEYS July 7, 1959  R. TRUBERT  2,893,637
THERMOSTATIC MIXER WITH DETACHABLE MECHANISM
Filed Sept. 14, 1956  3 Sheets-Sheet 2

INVENTOR
RENÉ TRUBERT
By Linton and Linton
ATTORNEYS

July 7, 1959     R. TRUBERT     2,893,637
THERMOSTATIC MIXER WITH DETACHABLE MECHANISM
Filed Sept. 14, 1956     3 Sheets-Sheet 3
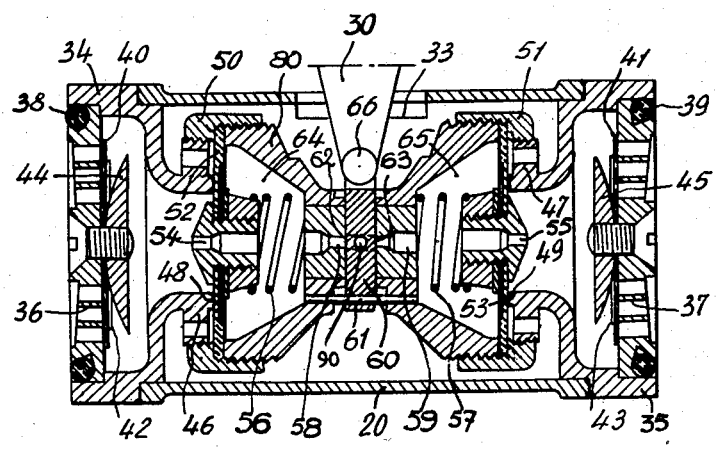
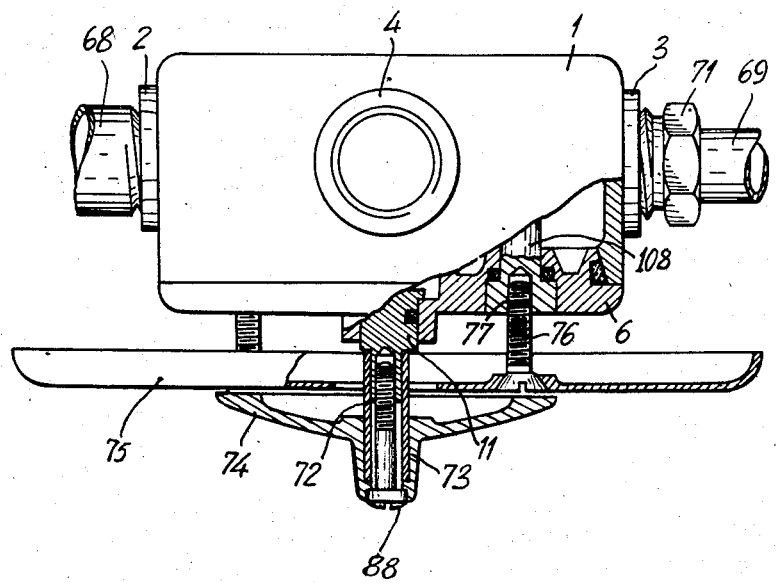
INVENTOR
RENÉ TRUBERT
By Linton and Linton
ATTORNEYS United States Patent Office 2,893,637
Patented July 7, 1959

2,893,637

THERMOSTATIC MIXER WITH DETACHABLE MECHANISM

René Trubert, Viroflay, France

Application September 14, 1956, Serial No. 609,826

Claims priority, application France, September 20, 1955

5 Claims. (Cl. 236—12)

This invention relates to a thermostatic fluid mixer fed from two pipes with a fluid, more particularly water, at different temperatures and adapted to supply through an outlet pipe a mixed liquid output of which the temperature is automatically kept at any desired and predetermined intermediate value depending only on the position of an external control member, for example a control knob.

In the following description only the mixing of hot water with cold water will be dealt with, but it is evident that the apparatus is also suitable for mixing any other liquids.

The thermostatic mixer according to this invention is of the general known type wherein the control member actuates a bimetallic strip immersed in the mixed liquid and adapted to automatically actuate a pair of inlet valves for the hot and cold water, each with a counter pressure chamber. To this end, the bimetallic strip actuates a central rocker pivotally mounted between these valves and adapted to open the counter-pressure chamber of one valve and close that of the other valve, and vice-versa, according as the temperature of the mixture in which the bimetallic strip is immersed deviates in one or the other direction from the temperature to which the control knob position corresponds.

The operation of known mixing devices of this general type is satisfactory as long as their component elements are in good order, but when any of these elements is deteriorated whether by scaling or for any other reason, it is generally necessary to repair or replace the complete mixer.

To do this, the mixer must be removed, dismantled and re-fitted after inspection, testing and if necessary replacement of parts, and only expert hands can be entrusted with these various operations. Besides, due to its removal the mixer cannot be used during the entire time period in which the repair or the recourse to a specialist may last, and on the other hand this removal may prevent the use of a complete installation in which the mixer was incorporated.

Now it is the essential object of this invention to avoid this drawback by enabling any normally skilled but non-specialised person to remove the complete mechanism of the mixer as a unit from its housing, without removing the latter from the pipe system with which it remains associated, and if desired to close this housing after the removal of the mechanism therefrom, and to finally either re-fit the mechanism in the housing after repairing same, or replace it with a similar mechanism in good order. Thus, on the one hand it will be possible to use a water distributing system in spite of the removal of the mechanism from the mixer incorporated therein, and, on the other hand, the mixer may be used again after simply effecting a provisional or definitive replacement of the mechanism, without having to wait until the mechanism is repaired. Finally, another advantage of this arrangement is that it is cheaper and easier to ship the mechanism alone to the specialist than a complete mixer.

It is an essential feature of this invention that the distributor system comprising the counter-pressure chamber valves and the central rocker actuated by the bimetallic strip be carried by a barrel having one inlet at either ends and a central outlet, this barrel extending inside a body of the apparatus from one to the other of its inlet pipes and comprising at either ends annular gaskets adapted, when the barrel is simply inserted in the body, to form fluid-tight joints by engaging registering seats formed on the inner faces of the inlet pipes of the body.

The aforesaid barrel is also provided with means for supporting the thermostatic mechanism comprising in turn a mount for the fixed end of the bimetallic strip, a movable system actuated from the external control member, and an internal adjustment device interposed between the aforesaid mount and movable system. The external control member extends through, and is supported by, a detachable cover of the mixer, and operatively connected to the aforesaid movable system through a simple tenon-and-groove driving connection obtained when the cover is fitted on the mixer, which is disconnected automatically when the cover is removed from the mixer.

In order to afford a clearer understanding of this invention and of the manner in which the same may be embodied in the practice, reference will now be made to the accompanying drawings forming part of this specification and illustrating diagrammatically by way of example a few embodiments of the invention. In the drawings:

Figure 1 is a front view of the apparatus;

Figure 2 is a section taken upon the line II—II of Figure 1;

Figure 5 is a front view of the complete thermostatic mechanism of the mixer, without the body;

Figure 6 is a side view of this mechanism;

Figure 7 is an axial section showing on a larger scale the distributor mechanism, and Figure 8 is a part-sectional, top plan view showing a modified embodiment permitting the embedded mounting of the apparatus at a certain depth, for example in a wall.

Figure 3:
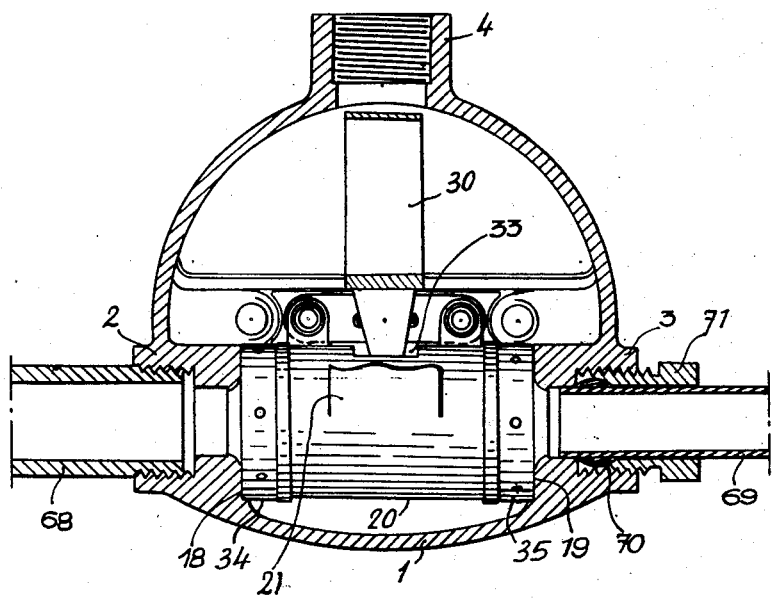
Figure 3 is another section but taken upon the line III—III of Figure 2.

In the embodiment shown in the drawings the body 1 of the mixer constitutes a generally cylindrical housing having two inlet pipes 2, 3, an outlet pipe 4 and a relatively large front aperture 5 through which the inner mechanism may be introduced, a removable cover 6 being provided for normally closing this aperture 5. The cover 6 is adapted to fit in the aperture 5 and has formed around its skirt extending in the housing a peripheral groove receiving a sealing ring or gasket 7 to form a fluid-tight joint between the housing and the cover. The cover is secured to the body 1 by means of screws 8; the head 9 of each screw 8 engages a sealing washer disposed in the bottom of a cavity formed in the front face of the cover, and the screw-threaded shank of each screw 8 engages a threaded hole formed in the body 1. The cover 6 has a central hollow projection 10 constituting a socket acting as a bearing to a spindle 11 of a driving key 12, a shaft packing 13 being inserted in a groove of the spindle 11, as shown. The spindle 11 has an outer extension on which a control knob 14 may be secured by means of a set screw 15 and the index-forming portion 16 of this knob is movable along a circular scale formed on a dial 17 secured on the outer face of the cover 6 by screws 67. This scale may indicate temperatures in degrees Celsius as shown in Figure 1, but it is evident that any other units may be used in this respect.

Figure 4:
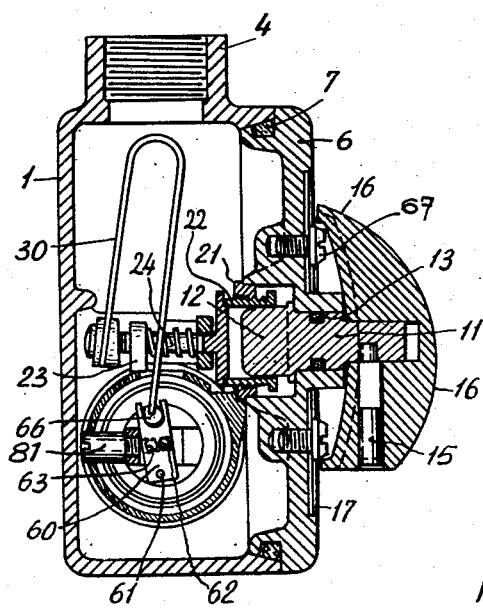
Figure 4 is a section taken upon the line IV—IV of Figure 1.

Between the inner seat-forming faces 18, 19 of the inlet pipes 2, 3 a cylindrical assembly is inserted which comprises the distributing system carried by a barrel 20. This barrel carries an internally threaded lug 21 adapted to receive an externally-threaded socket 22 constituting the movable system through which the bimetallic strip device may be set from the outside. This barrel 20 is also provided with a pair of lugs 23 constituting the bearings of a pair of rods 24 engaging through stop collars 25 a common front cross member 26. The heads of these screw-forming rods 24 extend through this member 26. Besides, each rod 24 has fitted therearound a coil spring 27 interposed between the corresponding lug 23 and stop collar 25 so as to constantly urge the rods 24 and cross member 26 towards the control knob 14. The screw-threaded rear ends of rods 24 engage corresponding threaded holes formed in another common rear cross-member 28 constituting the mount of the bimetallic strip 30 of which one end is secured by a screw 29 to this cross member 28. The bimetallic strip 30 has the shape of an inverted U, as shown in Figure 4. The springs 27 cause the cross member 26 to abut against the inner end of the socket 22 engaging this cross member through its central head 31. Thus, if the socket 22 is rotated by actuating the external control knob 14 in one or the other direction this socket 22 will move axially and drive in the same direction the assembly comprising the cross-member 26, rods 24 and cross-member 28, to permit the setting of the normally fixed end of the bimetallic strip 30 in the desired position of adjustment, that is, more or less close to the control knob 14.

The socket 22 consists of a central body carrying the head 31 and of an externally-threaded socket surrounding the central body. The latter is formed with a recess or slot directed to the front and adapted to receive the driving key 12. This recess or slot is designated by the reference numeral 32 and is shown in Figure 5 is preferably of tapered configuration. In this case the driving key 12 has a corresponding cross-sectional shape, so that these members may fit into each other only in one relative position and the stroke of the socket 22 is a little less than the pitch of its screwing in order to limit the rotation of the driving key to less than one turn. The barrel 20 is formed with a central outlet aperture 33, and has fitted in one end the hot-water bell-mouthed inlet member 34 and in the other end the cold water bell-mouthed inlet member 35. These inlet members 34, 35 carry grid-filters 36, 37 and sealing gaskets 38, 39 co-acting with the aforesaid seats 18, 19 formed on the inner faces of the inlet pipes 2, 3. The grid-filters 36, 37 constitute at the same time the seats of non-return valves 40, 41, of rubber or other suitable flexible material, which are held against the inner faces of the grids by resilient metal washers 42, 43 of which the deflection is limited by convex discs 44, 45 secured centrally of the inner face of these grids.

Each bell-mouthed inlet member 34, 35 is rigid with a perforated annular flange 46, 47 surrounding an annular seat 48, 49 and each flange 46, 47 is screwed in an internally-threaded ring 50, 51 screwed in turn on the corresponding end of a double-taper body 80 to clamp the peripheral edge of a valve member 52, 53 consisting of a flexible diaphragm urged in its closed position against the seat 48, 49 of the relevant bell-mouthed inlet 34, 35. The body 80 is held in position relative to the barrel 20 by a set screw 81 extending through the rear wall of the barrel and engaging the central, narrower portion of the body 80, as shown in Figure 4.

At their centers the valve members 52, 53 are provided with very small nozzles 54, 55 and springs 56, 57 are interposed between the bottoms of the cavities of the double-taper body 80 and the nozzle members to constantly urge the valves 52, 53 to their closed position.

Moreover, jet orifices 58, 59 are provided in the bottom of the aforesaid cavities of the body 80 and a rocker 60 is pivoted on a lower pin 61 rigid with the body 80 and parallel to the barrel axis. The faces of the rocker 60 which register with the jet orifices 58, 59 are formed with offset openings 62, 63 respectively so as to open one jet and close the other jet according as the rocker is pivoted in one or the other direction and both openings 62—63 communicate with a common central channel 90 which is opened at its both ends to annul the flow reactions. The nozzle passages 54, 55 and the jet passages 58, 59 have their cross-sectional dimensions so calculated that the opening of one jet will eliminate the counterpressure existing in the corresponding counter-pressure chamber 64, 65 formed in the body 80 behind each valve. The rocker walls and passages and the jet orifices 58, 59 are carefully polished to avoid calcareous deposits.

The rocker 60 is actuated through a ball or like member 66 disposed at the operative end of the bimetallic strip in a corresponding recess formed at the upper end of the rocker, that is, opposite the pivot pin 61.

From the drawings it is apparent that the barrel 20 and the bell-mouthed inlet members 34, 35 constitute a cylindrical assembly adapted to be inserted in a fluid-tight manner between the seats 18, 19. Thickness deviations of the flexible diaphragms 52, 53 may be compensated by screwing more or less the bell-mouthed inlet members 34, 35 in the rings 50, 51 so that to apply the members 34, 35 against the ends of the barrel 20; radial holes 78, 79 are drilled through the lateral walls of the bell-mouthed inlet members 34, 35 in the rings rotated by inserting an adequate tool in these holes. This adjustment is without inconvenience since the central zones of the diaphragms 52, 53 may take up any short displacements of the seats 48, 49 rigid with the bell-mouthed inlet members.

The operation of the apparatus described hereinabove is as follows. According to the position in which the rocker 60 is held by the bimetallic strip 30, one or the other counter-pressure chamber 64, 65 is opened through the jet orifice 58, 59 and the relevant diaphragm 52, 53 is moved away from its seat 48, 49 against the resistance of the corresponding spring by the pressure of the hot or cold water supplied through the bell-mouthed inlet member 34 or 35. The water flowing through the passage cleared by the diaphragm escapes from the barrel 20 through the central aperture 33 thereof and around the bimetallic strip 30. If the bimetallic strip 30 is cooled by this flow of water, it causes the rocker to pivot to the position corresponding to the supply of hot water, and if the strip is heated cold water is supplied to the apparatus. For a predetermined position of the rear cross member 28 and therefore of the bimetallic-strip mounting, the oscillating movements of this strip will alternately open the hot-water inlet and the cold-water inlet, thereby ensuring a constant temperature of the mixture with a remarkable accuracy. By displacing the cross-member 28 under the control of external control means such as the control knob 14 it is possible to modify at will the temperature of the mixture and the index 16 of this knob 14 will show along the scale of the dial 17 the temperature of the mixture thus obtained. By properly screwing in or out the preferably left-hand threaded screws 24 it is possible to alter the position of the rear cross member 28 with respect to the front cross-member 26 and therefore to adjust the position of the bimetallic strip mounting so that the action exerted by this strip will properly correspond to the setting of the index 16 on the scale or dial 17, and any slight differences occurring between the actions of two similar bimetallic strips may be compensated. This inner adjustment is to be effected at the works only and is not modified when the cover 6 and the external control means are subsequently removed.

When the distributor system must be repaired or replaced, it is sufficient to loosen the screw 15 securing the control knob 14 and to remove the dial 17; when the latter is removed the screws 8 become apparent and can be loosened to remove the cover 6. Then, the operator may remove as a unit the distributor system illustrated in Figures 5 and 6 of the drawings. This unit may be replaced on the spot by another, identical unit, so that the apparatus may be re-used immediately, that is, without waiting until the initial unit is repaired. Even if the distributor system were not replaced immediately, the mixer may be closed by re-fitting the cover 6 and in certain cases this will avoid any unpleasant stoppage in the operation of a series of apparatus connected to the same lines in spite of the absence of the mixer.

In Figures 1 and 2 of the drawings, nipples 82, 83 are screwed in the inlet pipes 2, 3 so as to receive the gland nuts for connecting water supply lines. With this arrangement, the complete apparatus may be removed, but it is evident that any other suitable connection system may be used, if desired. In Figure 3 there is shown on the left the mounting of a steel tube 68 screwed directly in the pipe 2, and on the right, the mounting of a copper tube 69 fitted in the pipe 3 in which a gland nut 71 is screwed to clamp a sealing plastic ring 70 on the tube 69.

The mixer described hereinabove may be fitted on a wall or like surface, or embedded in a cavity. In this last case the cover 6 may be level or flush with the wall surface. However, in certain cases it may be necessary to embed the apparatus in the wall at a depth greater than the thickness of the apparatus. In this case the spindle 11 may have a socket-like extension 72, for example a square tube and the cut to size socket or tube 72 forms a distance member in respect to the knob-dial unit 73, 74 of which an internal axial recess surrounds one end of the socket extension 72, whereby it is easy to adjust the gap between the knob-dial unit and the apparatus body in relation with the depth of the embedding. The front plate 75 will be secured to the cover 6 by screws 76 of which each is to be screwed in a threaded hole 77 provided in the head of the cover fixing screws 108. This front plate lies against the face of the wall in which the apparatus is embedded. Screws of various lengths 76 may be provided corresponding to the depth of the embedding. The knob-dial unit 73 is secured by an axial screw 88 on the spindle 11.

In the embodiment shown in the Figure 8, the dial 74 is integral with the knob 73 as a unit which is rotatable with respect to a fixed index (not shown) mounted on the front plate 75, whereby the adjustment temperature is marked. The apparatus is dismantled only by unscrewing the screws 88, removing the knob-dial unit 73–74 and dismounting the cover 6.

In the case of large size apparatus the cover 6 is to be secured on the body by an outer circular set of threaded pins and nuts instead of the pair of screws 8 which penetrate into the body 1.

It will be readily understood that the typical embodiment shown in the accompanying drawings and described hereinabove should not be construed as limiting the purpose of the invention as many modifications may be brought thereto without departing from the scope thereof.

I claim:

1. A thermostatic mixer for a hot fluid and a cold fluid comprising in combination a hollow body having opposing inlet openings arranged for connection to hot and cold fluid delivery pipes and an outlet opening for connection to a feeding pipe, said body further having a pair of seat-forming faces each provided at the inner end of one of said inlet openings and a front aperture, a cover tightly and detachably mounted on said body closing said front aperture, a fluid mixing mechanism, an open end hollow barrel containing said entire mixing mechanism and mounted within said body with its ends each tightly abutting one of said seat-forming faces, said barrel also having an outlet opening into said body, a thermostatic bimetallic strip connected at one end to said mixing mechanism for operating the same, control means in two separable parts of which one part has the other end of said bimetallic strip connected thereto is mounted on said barrel and the other part is mounted through said cover for being exteriorly actuated, and an adjusting means within said body connected to said barrel and said other end of said bimetallic strip and capable of pre-setting said bimetallic strip.

2. A thermostatic mixer according to claim 1, wherein said mixing means includes a central rocker controlling the flow of fluid therethrough, said bimetallic strip has the shape of an inverted U and a ball member is provided on said first mentioned end of said strip for actuating said central rocker.

3. A thermostatic mixer according to claim 1, wherein a pair of bell-mounted inlet members are each fitted in one of said ends of said barrel, a pair of annular gaskets are each mounted on one of said inlet members and adapted to engage in a fluid-tight manner the annular seat formed on adjacent inner face of said body around the relevant inlet pipe.

4. A thermostatic mixer according to claim 1 wherein a pair of bell-mounthed inlet members are each fitted in one of said ends of said barrel, a pair of grid-filters are each mounted in an end of one of said inlet members, and a pair of one way valves each mounted on one of said grid-filters and seatable thereagainst preventing the flow of fluid from said barrel open ends.

5. A thermostatic mixer for a hot fluid and a cold fluid comprising a hollow body having a pair of opposed inlet openings and an outlet opening, said body having a front aperture, a cover detachably mounted on said body closing said aperture, an open end barrel detachably mounted in said body and extending between said inlet openings, said barrel having an outlet opening into said body, a fluid mixing mechanism including a controlling rocker mounted entirely within said barrel, a threaded lug carried by said barrel, a threaded socket in threaded engagement with said lug, detachable means extending through said cover for operating said socket, a bimetallic strip connected at one end to said rocker for controlling the same, means connecting the other end of said strip to said socket for being adjusted thereby including a pair of cross members having openings therethrough and with said other end of said strip connected to one of said cross members, said member connected to said strip having said openings therethrough being threaded, a pair of lugs mounted on said barrel each having an opening therethrough, a pair of threaded rods extending through said member openings and said lug openings and being in threaded engagement with said openings of the member connected to said strip for adjusting the position of said connected member, a pair of coil springs each surrounding one of said rods and extending between said lugs and the other of said cross members tending to space the same apart, and means detachably connecting said other cross member to said socket.

References Cited in the file of this patent

UNITED STATES PATENTS

| | | |
|---|---|---|
| 1,787,304 | Becker | Dec. 30, 1930 |
| 1,788,765 | Hamblin et al. | Jan. 13, 1931 |
| 2,471,725 | Clifford | May 31, 1949 |
| 2,517,056 | Trubert | Aug. 1, 1950 |
| 2,819,843 | Edwards | Jan. 14, 1958 |